United States Patent
Skertich et al.

(10) Patent No.: US 10,524,106 B1
(45) Date of Patent: Dec. 31, 2019

(54) DELIVERING VIDEO EMERGENCY SERVICES USING RICH COMMUNICATION SERVICE (RCS) PROTOCOLS

(71) Applicant: Securus Technologies, Inc., Carrollton, TX (US)

(72) Inventors: Jennifer Skertich, Carrollton, TX (US); Alexander Noland, North Richland Hills, TX (US); John Wange, Dallas, TX (US)

(73) Assignee: Securus Technologies, Inc., Carrollton, TX (US)

( * ) Notice: Subject to any disclaimer, the term of this patent is extended or adjusted under 35 U.S.C. 154(b) by 0 days.

(21) Appl. No.: 15/798,006

(22) Filed: Oct. 30, 2017

(51) Int. Cl.
| | |
|---|---|
| *H04W 4/90* | (2018.01) |
| *H04W 4/14* | (2009.01) |
| *H04M 3/51* | (2006.01) |
| *H04L 29/06* | (2006.01) |
| *H04M 3/42* | (2006.01) |
| *H04N 7/14* | (2006.01) |
| *H04W 4/02* | (2018.01) |

(52) U.S. Cl.
CPC ........... *H04W 4/90* (2018.02); *H04L 65/1089* (2013.01); *H04M 3/42221* (2013.01); *H04M 3/5116* (2013.01); *H04M 3/5183* (2013.01); *H04N 7/147* (2013.01); *H04W 4/14* (2013.01); *H04W 4/02* (2013.01)

(58) Field of Classification Search
CPC combination set(s) only.
See application file for complete search history.

(56) References Cited

U.S. PATENT DOCUMENTS

| | | | | |
|---|---|---|---|---|
| 9,363,472 | B2 * | 6/2016 | Rowe | H04N 7/15 |
| 2012/0204029 | A1 * | 8/2012 | Trabucco | H04N 7/147 |
| | | | | 713/168 |
| 2012/0281058 | A1 * | 11/2012 | Laney | H04N 7/147 |
| | | | | 348/14.03 |
| 2014/0199959 | A1 * | 7/2014 | Hassan | H04W 4/029 |
| | | | | 455/404.2 |
| 2015/0350983 | A1 * | 12/2015 | Kwok | H04L 65/1069 |
| | | | | 370/331 |
| 2016/0021146 | A1 * | 1/2016 | Mufti | H04L 65/1016 |
| | | | | 370/328 |
| 2017/0127261 | A1 * | 5/2017 | Sennett | H04W 4/90 |
| 2017/0264604 | A1 * | 9/2017 | Drako | H04L 63/083 |
| 2017/0295477 | A1 * | 10/2017 | Clawson | H04W 4/90 |
| 2017/0310827 | A1 * | 10/2017 | Mehta | H04W 4/90 |
| 2018/0013889 | A1 * | 1/2018 | Klaban | H04W 4/029 |
| 2018/0082717 | A1 * | 3/2018 | Bose et al. | G11B 27/34 |
| 2018/0084100 | A1 * | 3/2018 | Chockalingam | H04L 65/1016 |
| 2018/0262614 | A1 * | 9/2018 | Drake | H04M 3/42042 |
| 2019/0020992 | A1 * | 1/2019 | Romano | H04W 4/90 |

\* cited by examiner

*Primary Examiner* — Phung-Hoang J Nguyen
(74) *Attorney, Agent, or Firm* — Fogarty LLP

(57) ABSTRACT

Systems and methods for delivering video emergency services using Rich Communication Service (RCS) protocols are disclosed. In some embodiments, a method may include: receiving, at a 9-1-1 dispatch system, a 9-1-1 text message sent via a computing device using an RCS protocol, and initiating a 9-1-1 video communication with the computing device following the RCS protocol.

20 Claims, 4 Drawing Sheets

DELIVERING VIDEO EMERGENCY SERVICES USING RICH COMMUNICATION SERVICE (RCS) PROTOCOLS

TECHNICAL FIELD

This specification relates generally to telecommunications, and, more particularly, to systems and methods for delivering video emergency services using Rich Communication Service (RCS) protocols.

BACKGROUND

Approximately 250 million calls are made to 9-1-1 in the U.S. each year. In many areas, 80% of these calls now come from mobile devices. Basic 9-1-1 means that, when the three-digit number is dialed, a dispatcher in a local Public Safety Answering Point (PSAP) answers the call. The emergency and its location can be communicated by voice between the caller and the dispatcher, and the dispatcher then activates the appropriate emergency responders (e.g., police, fire department, emergency medical services, etc.).

In areas that provide "enhanced 9-1-1" services, calls can be automatically routed to the proper PSAP for the caller's location, and the PSAP has the equipment and database information to automatically obtain the caller's phone number and address. The vast majority of U.S. counties with 9-1-1 coverage also has enhanced 9-1-1 features.

The inventors hereof have recognized, however, that current 9-1-1 system lags behind many modern technologies. For example, although a newly launched "text-to-9-1-1" program now allows users to send text messages to reach dispatchers from a mobile phone or device, the technology is only available in limited locations.

Certain commercial software purports to bridge this gap with so-called "9-1-1 apps," but these applications misleadingly hold themselves out as replacing or augmenting official 9-1-1 services. In reality, when using a third-party application, the caller's information must be relayed to a PSAP by a private call center in order to get help, therefore presenting significant problems for PSAPs, and putting people at risk.

SUMMARY

Embodiments disclosed herein are directed to systems and methods for delivering video emergency services using rich communication protocols. In an illustrative, non-limiting embodiment, a method may include: receiving, at a 9-1-1 dispatch system, a 9-1-1 text message sent via a computing device using an RCS protocol, and initiating a 9-1-1 video communication with the computing device following the RCS protocol.

In various implementations, the 9-1-1 video communication may be supported by a Computer-Aided Dispatch (CAD) system. The method may also include sending a 9-1-1 video request to the computing device in response to receiving the 9-1-1 text message, and initiating the 9-1-1 video communication in response to receiving an acceptance of the 9-1-1 video communication request from the computing device. Additionally or alternatively, the method may comprise recording the 9-1-1 video communication.

In some cases, the computing device may be operated by a resident of a controlled-environment facility. Additionally or alternatively, the computing device may be operated during a video visitation session between a resident and a non-resident of a controlled-environment facility. Additionally or alternatively, at least a portion of the video visitation session between the resident and the non-resident may be transmitted to the 9-1-1 dispatch system.

The 9-1-1 text message may be transmitted in response to a triggering event detected during the video visitation session. The triggering event may be detected, at least in part, by a communication processing system of the controlled-environment facility based, at least in part, upon an identity of the resident or an identity of the non-resident. Additionally or alternatively, the triggering event may be based, at least in part, upon a geo-location of the computing device.

In another illustrative, non-limiting embodiment, a computer system may include a processor; and a memory coupled to the processor, the memory having program instructions stored thereon that, upon execution by the processor, cause the computer system to: transmit a 9-1-1 text message to an RCS interface supporting a 9-1-1 dispatch center, and participate in a 9-1-1 video communication with the 9-1-1 dispatch center, the 9-1-1 video communication supported by the RCS interface.

In yet another illustrative, non-limiting embodiment, a hardware memory device may have program instructions stored thereon that, upon execution by a computer system, cause the computer system to: receive an emergency services text message via an RCS server of a telecommunications carrier supporting a mobile device, send an emergency services video communication request to the mobile device, and initiate an emergency services video communication in response to receiving an acceptance of the request from the mobile device.

In various embodiments, one or more of the techniques described herein may be performed by one or more computer systems. In other various embodiments, a hardware memory device may have program instructions stored thereon that, upon execution by one or more computer systems, cause the one or more computer systems to execute one or more operations disclosed herein. In yet other various embodiments, a system may include at least one processor and memory coupled to the at least one processor, the memory configured to store program instructions executable by the at least one processor to cause the system to execute one or more operations disclosed herein.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

Figure 1:
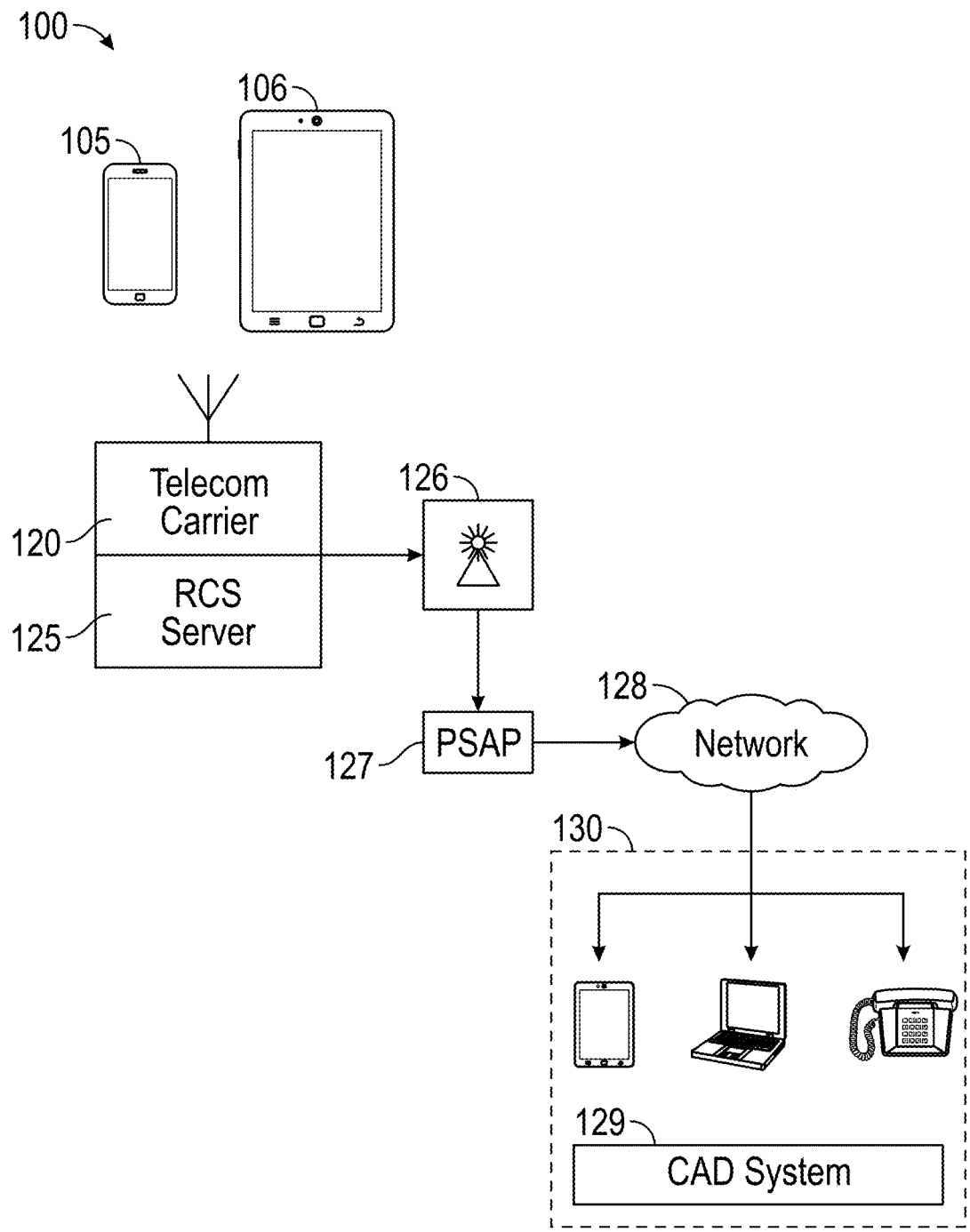
FIG. 1 is a diagram of an example of a system for delivering video emergency services using rich communication protocols according to some embodiments.

While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but, on the contrary, the intention is to cover all modifications, equivalents and alternatives falling within the spirit and scope of the claims. Also, any headings used herein are for organizational purposes only and are not intended to limit the scope of the description. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

DETAILED DESCRIPTION

This specification relates generally to systems and methods for delivering video emergency services using Rich Communications Services (RCS). In many embodiments, these systems and methods may be applied to any 9-1-1 or emergency dispatch services, regardless of the environment in which that service is provided.

RCS is a communication protocol used between wireless telephone carriers, as well as between mobile phones and carriers, that replaces Short-Messaging Service (SMS) messages with a text-message system that is more rich, provide phonebook polling (e.g., for service discovery), and transmits in-call multimedia.

RCS combines different services defined by 3rd Generation Partnership Project (3GPP) and Open Mobile Alliance (OMA) with an enhanced phonebook. Another phone's capabilities and presence information can be discovered and displayed by a mobile phone. RCS reuses 3GPP specified IP Multimedia Subsystem or IP Multimedia Core Network Subsystem (IMS) core system as an underlying service platform taking care of issues such as authentication, authorization, registration, charging and routing.

RCS is currently marketed under the names: Advanced Messaging, Advanced Communications, joyn, and Message+. As of now, the following services are a part of the RCS specifications of RCS: messaging, chat, file transfer, content sharing, voice call, video call, geo-location, audio messaging, etc.

Mobile devices are embedded with some form of native text messaging program. However, mobile devices can be required to video communicate with dispatch operators in order to invoke certain emergency services. To fulfill these requirements, users have had to download and install third-party applications in their mobile devices.

To address these, and other problems, various embodiments of systems and methods described herein enable users to video communicate with 9-1-1 or other emergency service dispatchers via native messaging programs that implement RCS, thus eliminating the need for third-party applications.

For example, a user may generate an outbound 9-1-1 message through a native or standardized messaging program via the user's mobile device. An 9-1-1 dispatcher may receive the RCS emergency message and, in some cases, may send a video request in response. In other cases, the 9-1-1 dispatcher may automatically initiate a video session without such request. The user may accept the video session request within their native or standardized messaging program using RCS. If the 9-1-1 dispatcher automatically initiates video session, however, no action is required by the user.

Each 9-1-1 or emergency video communication session (including audio) may be recorded and stored for evidentiary purposes, for example. In various implementations, a Computer-Aided Dispatch (CAD) system may be configured to accommodate the aforementioned operations.

Turning now to FIG. 1, a block diagram of an example of a system for delivering video emergency services using rich communication protocols is depicted, according to some embodiments. As shown, system 100 may provide telephone services, videoconferencing, online chat, email, and other communication services. More generally, however, it should be noted that communication system 100 may assume a variety of forms, and may be configured to serve a variety of customer users, whether within or outside a controlled-environment facility.

For example, a subscriber of wireless telecommunication carrier 120 may use communication devices 105 or 106 to access certain emergency communication services. In some cases, devices 105 or 106 may include a personal computer wireless device, such as a tablet or cell phone, to access such services. In such implementations, a user may invoke communication services by starting an application configured to enable voice or video communications, dialing a phone number, sending a text message, etc.

Under control of wireless telecommunication carrier 120, devices 105 and 106 may be capable of connecting to Public Safety Answering Point (PSAP) system 127 via phone or cell tower or wireless cell phone network 126. Wireless telecommunication carrier 120 is an entity or system providing communication services to various devices shown in FIG. 1. Although only one telecommunication carrier is depicted, it should be noted that, in many cases, multiple different carriers may be used in the same communication, particularly when three-way communication takes place.

In many implementations, telecommunication carrier 120 includes its own RCS server(s) 125 configured to provide RCS services to subscribers 105 or 106. In operation, RCS server 125 supports a communication protocol used between different telecommunication carriers, and also between wireless telecommunication carrier 120 and its subscribers 105 or 106, that provides a text-message system that is more rich than conventional Short Message Service (SMS) supports, with features such as phonebook polling (for service discovery) and transmit in-call multimedia.

In some cases, PSAP (or Next-Generation 9-1-1) system 127 pushes an incoming emergency call or text from subscribers 105 or 106 call to a correct dispatch center 130 via network 128. In some cases, PSAP SYSTEM 127 may route the emergency call to dispatch center 130 based upon the subscriber's physical location at the time of the call. In other cases, PSAP SYSTEM 127 may route the emergency call to center 130 based upon local RCS capabilities.

As such, 9-1-1 dispatch center 130 may include one or more systems configured to provide emergency services to callers, such as networked dispatch terminals that may be coupled to a CAD system 129 or the like. In operation, 9-1-1 dispatch center 130 provides a universal, easy-to-remember number for people to reach police, fire or emergency medical assistance from any phone in any location, without having to look up specific phone numbers.

Figure 2:
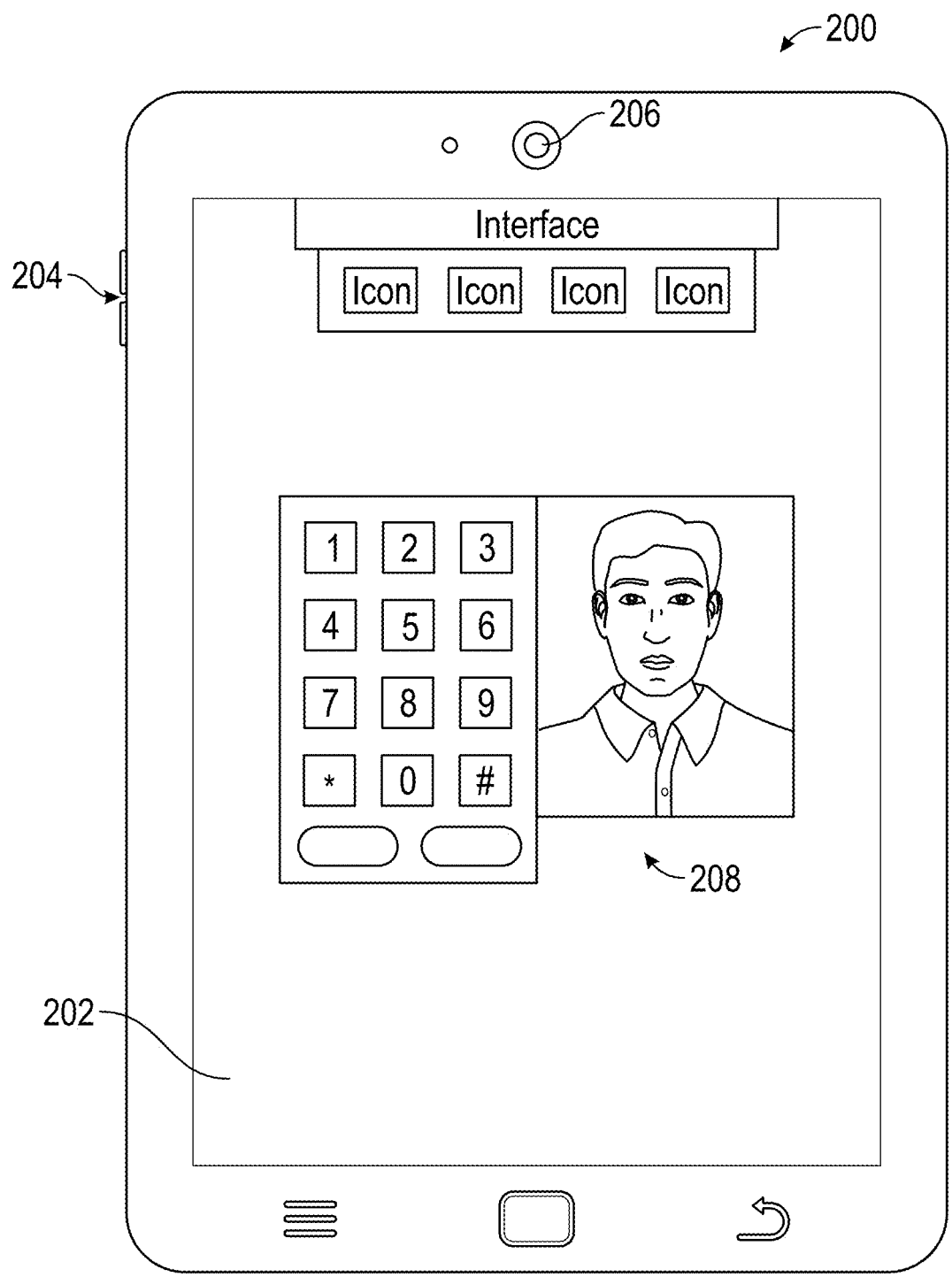
FIG. 2 is a diagram of an example of a communication device according to some embodiments.

FIG. 2 is a diagram of communication device 200. In some embodiments, device 200 may be used to implement devices 105 or 106. Device 200 includes display 202, one or more hardware buttons 204, and camera/microphone/speaker 206. As will be appreciated, device 200, or other similar devices have telephone, text, and video call capabilities, to enable a party to participate in a communication session with another party, such as an operator of PSAP SYSTEM 127 and/or 9-1-1 dispatch center 130, via graphical user interface (GUI) 208.

Display 202 may be any suitable electronic display such as, for example, a Liquid Crystal Display (LCD), a touchscreen display (e.g., resistive, capacitive, etc.), or the like, whereas camera 206 may be a suitable imaging device such as, for instance, a video camera or webcam equipped with Charge-Coupled Devices (CCDs), Complementary Metal-Oxide-Semiconductor (CMOS) active pixel sensors, etc.

During a video communication, for example, device 200 may be configured to capture a video image of a subscriber to be transmitted to 9-1-1 personnel using camera 206, and to display a video image of the non-resident to the inmate using display 202. Device 200 may also be configured to capture an audio signal from the subscriber to be transmitted to 9-1-1 personnel, and to provide an audio signal from 9-1-1 personnel to the subscriber.

It should be noted that device 200 may assume the form of any computer, tablet computer, smartphone, etc., or any other consumer device or appliance with wireless cell phone communication capabilities.

Figure 3:
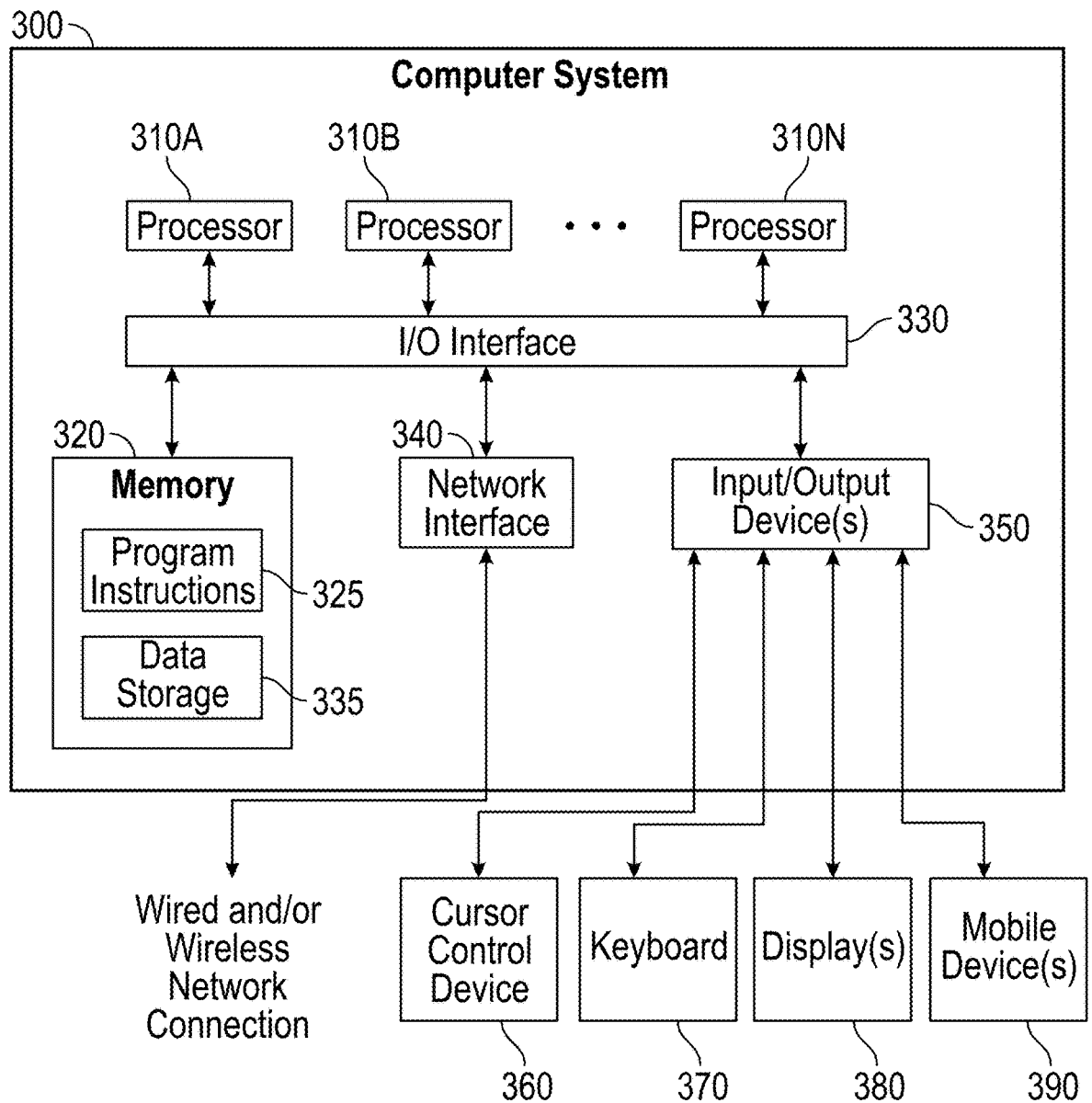
FIG. 3 is a diagram an example of a computer system configured to implement various systems and methods described herein according to some embodiments.

As noted above, embodiments of systems and methods for delivering video emergency services using rich communication protocols may be implemented or executed by one or more computer systems. One such system is illustrated in FIG. 3. In various embodiments, computer system 300 may be a server, a workstation, a desktop computer, a laptop, a tablet computer, a mobile device, a smart phone, or the like. For example, components of computer system 300 may be used to implement components of device 200.

As illustrated, computer system 300 includes one or more processors 310A-N coupled to a system memory 320 via an input/output (I/O) interface 330. Computer system 300 further includes a network interface 340 coupled to I/O interface 330, and one or more input/output devices 350, such as cursor control device 460, keyboard 470, display(s) 480, or mobile device(s) 490.

Other devices may include, for example, surveillance cameras, microphones, antennas/wireless transducers, phone detection modules, etc. In some embodiments, each computer system may be implemented using a single instance of computer system 300, while in other embodiments multiple such systems, or multiple nodes making up computer system 300, may be configured to host different portions of a given electronic device or system.

In various embodiments, computer system 300 may be a single-processor system including one processor 310, or a multi-processor system including two or more processors 310 (e.g., two, four, eight, or another suitable number). Processors 310 may be any processor capable of executing program instructions. For example, in various embodiments, processors 310 may be general-purpose or embedded processors implementing any of a variety of instruction set architectures (ISAs), such as the x86, PowerPC®, ARIVI®, SPARC®, or MIPS® ISAs, or any other suitable ISA. In multi-processor systems, each of processors 310 may commonly, but not necessarily, implement the same ISA. Also, in some embodiments, at least one processor 310 may be a graphics processing unit (GPU) or other dedicated graphics-rendering device.

System memory 320 may be configured to store program instructions and/or data accessible by processor 310. In various embodiments, system memory 320 may be implemented using any suitable memory technology, such as static random access memory (SRAM), synchronous dynamic RAM (SDRAM), nonvolatile/Flash-type memory, or any other type of memory.

As illustrated, program instructions and data implementing certain operations described herein may be stored within system memory 320 as program instructions 325 and data storage 335, respectively. In other embodiments, program instructions and/or data may be received, sent or stored upon different types of computer-accessible media or on similar media separate from system memory 320 or computer system 300.

Generally speaking, a computer-accessible medium may include any tangible storage media or memory media such as electronic, magnetic, or optical media—e.g., disk or CD/DVD-ROM coupled to computer system 300 via I/O interface 330. Program instructions and data stored on a tangible computer-accessible medium in non-transitory form may further be transmitted by transmission media or signals such as electrical, electromagnetic, or digital signals, which may be conveyed via a communication medium such as a network and/or a wireless link.

In one embodiment, I/O interface 330 may be configured to coordinate I/O traffic between processor 310, system memory 320, and any peripheral devices in the device, including network interface 340 or other peripheral interfaces, such as input/output devices 350. In some embodiments, I/O interface 330 may perform any necessary protocol, timing or other data transformations to convert data signals from one component (e.g., system memory 320) into a format suitable for use by another component (e.g., processor 310).

In some embodiments, I/O interface 330 may include support for devices attached through various types of peripheral buses, such as a variant of the Peripheral Component Interconnect (PCI) bus standard or the Universal Serial Bus (USB) standard, for example. In some embodiments, the function of I/O interface 330 may be split into two or more separate components, such as a north bridge and a south bridge, for example. In addition, in some embodiments some or all of the functionality of I/O interface 330, such as an interface to system memory 320, may be incorporated directly into processor 310.

Network interface 340 may be configured to allow data to be exchanged between computer system 300 and other devices attached to a network, such as other computer systems, or between nodes of computer system 300. In various embodiments, network interface 340 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 350 may, in some embodiments, include one or more display terminals, keyboards, keypads, touchpads, scanning devices, voice or optical recognition devices, mobile devices, or any other devices suitable for entering or retrieving data by one or more computer system 300. Multiple input/output devices 350 may be present in computer system 300 or may be distributed on various nodes of computer system 300. In some embodiments, similar input/output devices may be separate from computer system 300 and may interact with one or more nodes of computer system 300 through a wired or wireless connection, such as over network interface 340.

As shown in FIG. 3, memory 320 may include program instructions 325, configured to implement certain embodiments described herein, and data storage 335, comprising various data may be accessible by program instructions 325. In an embodiment, program instructions 325 may include software elements of embodiments illustrated in the above figures. For example, program instructions 325 may be implemented in various embodiments using any desired programming language, scripting language, or combination of programming languages and/or scripting languages (e.g., C, C++, C#, Java™, JavaScript™, Perl, etc.). Data storage 335 may include data that may be used in these embodiments (e.g., recorded communications, profiles for different modes of operations, etc.). In other embodiments, other or different software elements and data may be included.

A person of ordinary skill in the art will appreciate that computer system 300 is merely illustrative and is not intended to limit the scope of the disclosure described herein. In particular, the computer system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations.

Figures 4, 5:
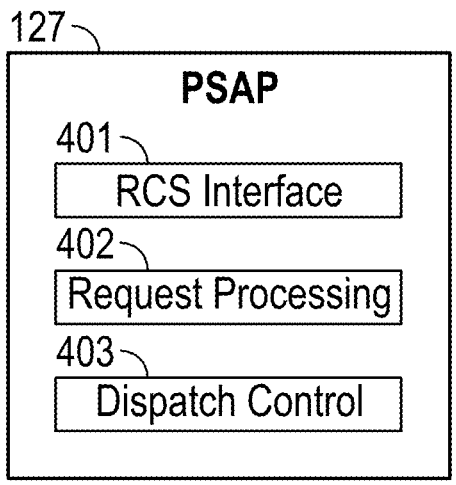
FIG. 4 is a diagram of an example of a 9-1-1 dispatch system according to some embodiments.
FIG. 5 is a diagram of an example of a method for delivering video emergency services using rich communication protocols according to some embodiments.

FIG. 4 is a diagram of an example of PSAP system 127. In some embodiments, system 400 may be part of a CAD system in a PSAP. As such, PSAP system 127 includes a RCS interface 401, request processing system 402, and dispatch control system 403.

RCS interface 401 may be a module within PSAP system 127 that enables its devices to use one or more RCS protocols native to a caller's mobile device. Request processing system 402 may provide call receiving features (phone status, CDR, etc.) and incident registration (location searches, input forms, etc.). And dispatch control system 403 may enable dispatch orders and field control operations.

When implemented to support web-based and/or RCS-based interactions, interface 401 may be deployed using a number of suitable techniques. For example, interface 401 may be implemented using Hypertext Markup Language (HTML), Common Gateway Interface (CGI), Javascript, PHP, Perl, C/C++, or any suitable combination of these or other commercial, open source and/or proprietary languages, frameworks or development environments for generating and distributing web-based information.

Further, in some implementations, request and response data may be exchanged between devices through the use of messages or documents formatted in eXtensible Markup Language (XML) or other platform-independent data format. For example, in some embodiments, a web services request to provide communication services may be embodied in an XML document including fields, in which each field is delimited by an XML tag describing the type of data the field represents. In other implementations, web services-related documents may be transmitted between applications making requests and targeted web services using a web-based data transfer protocol, such as a version of the Hypertext Transfer Protocol (HTTP), for example.

FIG. 5 is a diagram of an example of method 500 for delivering video emergency services using RCS protocols. In some embodiments, method 500 may be performed, at least in part, using RCS messaging applications that are native to mobile communication device 200 and provide video communication capabilities alongside text messaging features.

At block 501, a communication device transmits an emergency services (e.g., 9-1-1) text message to a PSAP and/or 9-1-1 dispatch center using an RCS protocol of a messaging application native to the communication device. The PSAP and/or 9-1-1 dispatch center receives the message and determines whether a request for a video communication is necessary in order to provide the requested emergency services. In many implementations, the PSAP may route the incoming request to a selected one of a plurality of 9-1-1 dispatch centers based upon proximity to the caller's location (as a first selection factor), RCS or video emergency capabilities of a particular dispatch center (as a second selection factor), etc.

At block 502, the communication device may receive a request from the PSAP and/or 9-1-1 dispatch center for a video communication. In some cases, the request may be sent automatically in response to the text message. In other cases, the request may be issued under an operator's command. At block 503, the wireless subscriber may accept the request via the communication device. In some cases, block 503 may be performed based of preferences or privacy settings used by the communication device in its native messaging application. For example, privacy settings may indicate a user's predetermined decisions of whether or not to: send audio, receive audio, send video, or receive video, when communicating with the PSAP and/or 9-1-1 dispatch center.

Additionally or alternatively, the request of block 502 may be initiated by a user operating the communication device. The request of block 502 may be accepted by the PSAP and/or 9-1-1 dispatch center at block 503.

At block 504, the communication device may participate in the video communication with an emergency dispatcher using the RCS protocol, still within the communication device's native messaging application. In some cases, still at block 504, the video communication with the dispatcher may be recorded and stored for investigative or evidentiary purposes.

In some cases, systems and methods described herein may receive geo-location coordinates of the communication device, which indicates where the device is being used (e.g., latitude/longitude, carrier, cell sector, tower triangulation, Global Positioning System (GPS) coordinates, IP address information, etc.). Moreover, any of blocks 501-504 may be performed in response to the geo-location information indicating that the communication device is within (or outside) of a selected area.

Additionally or alternatively, systems and methods described herein may accept and/or request data locally stored in the communication device such as, for example, contact lists, pictures, chats etc. In some cases, a video feed of the caller's device may be transmitted to an officer in the field in order to prepare the office for the emergency situation expected at the scene. Additionally or alternatively, a dispatcher may send an alert to the communication device that causes that communication device to put out a signal (e.g., an audible sound, an RF signal, etc.) to facilitate finding the caller at his or her location.

In various implementations, the communication device may be operated by an inmate in a correctional facility. For example, the communication device may be operated during a video visitation session between an inmate and a non-resident of the correctional facility, and at least a portion of the ongoing video visitation session may be transmitted to the 9-1-1 dispatch center as part of block 504, still relying on the RCS protocol. In this case, at block 501, the 9-1-1 text message may be transmitted in response to a triggering event detected during the video visitation session. The triggering event may be detected, at least in part, by a communication processing system of the correctional facility based, at least in part, upon an identity of the inmate and/or an identity of the non-resident.

For example, the triggering event may be detected, at least in part, based upon inmate information maintained by an Administration and Management System (AMS) that includes inmate profile data, such as: balances for inmate trust and calling accounts; trial schedule; conviction data; criminal record; sentencing data, such as time served, time remaining to be served, and release date; cell and cellmate assignments; inmate restrictions and warnings; commissary order history; telephone call history; call recordings; known or suspected gang or criminal affiliations; known or suspected affiliates, accomplices, or gang members; and any other information that may be relevant or useful to correctional facility staff to house and maintain inmates.

The various systems and methods illustrated in the figures and described herein represent example embodiments of systems and methods for delivering video emergency services using rich communication protocols. These techniques may be implemented in software, hardware, or a combination thereof. The order in which each operation of a given method is performed may be changed, and various elements of the systems illustrated herein may be added, reordered, combined, omitted, modified, etc. Various modifications and changes may be made as would be clear to a person of ordinary skill in the art having the benefit of this specification. It is intended that the invention(s) described herein embrace all such modifications and changes and, accordingly, the above description should be regarded in an illustrative rather than a restrictive sense.

The invention claimed is:

1. A method, comprising:
    receiving, at a 9-1-1 dispatch system, a 9-1-1 text message sent via a computing device using a Rich Communication Services (RCS) protocol; and
    initiating a 9-1-1 video communication with the computing device following the RCS protocol using a native computing device application and privacy settings of the native computing device application, exclusive of any third-party application.

2. The method of claim 1, wherein the 9-1-1 video communication is supported by a Computer-Aided Dispatch (CAD) system.

3. The method of claim 1, further comprising:
    sending a 9-1-1 video request to the computing device in response to receiving the 9-1-1 text message; and
    initiating the 9-1-1 video communication in response to receiving an acceptance of the 9-1-1 video communication request from the computing device.

4. The method of claim 1, further comprising recording the 9-1-1 video communication.

5. The method of claim 1, wherein the computing device is operated by a resident of a controlled-environment facility.

6. The method of claim 1, wherein the computing device is operated during a video visitation session between the resident and a non-resident of a controlled-environment facility.

7. The method of claim 6, wherein at least a portion of the video visitation session between the resident and the non-resident is transmitted to the 9-1-1 dispatch system.

8. The method of claim 6, wherein the 9-1-1 text message is transmitted in response to a triggering event detected during the video visitation session.

9. The method of claim 8, wherein the triggering event is based, at least in part, upon a geo-location of the computing device.

10. The method of claim 8, wherein the triggering event is detected, at least in part, by a communication processing system of the controlled-environment facility based, at least in part, upon an identity of the resident or an identity of the non-resident.

11. A computer system, comprising:
    a processor; and
    a memory coupled to the processor, the memory having program instructions stored thereon that, upon execution by the processor, cause the computer system to:
        transmit a 9-1-1 text message to a Rich Communication Services (RCS) interface supporting a 9-1-1 dispatch center; and
        participate in a 9-1-1 video communication with the 9-1-1 dispatch center using a native computing device application and privacy settings of the native computing device application, exclusive of any third-party application, the 9-1-1 video communication supported by the RCS interface.

12. The computer system of claim 11, wherein the program instructions, upon execution, further cause the computer system to:
    receive a 9-1-1 video communication request in response to transmitting the 9-1-1 text message; and
    participate in the 9-1-1 video communication after providing an acceptance to the 9-1-1 video communication request.

13. The computer system of claim 11, wherein the computer system is operated during a video visitation session between a resident and a non-resident of a controlled-environment facility.

14. The computer system of claim 13, wherein the program instructions, upon execution, further cause the computer system to share at least a portion of the video visitation session between the resident and the non-resident with the 9-1-1 dispatch center during the 9-1-1 video communication.

15. The computer system of claim 13, wherein the 9-1-1 video communication is allowed, at least in part, upon a geo-location of the computer system.

16. The computer system of claim 14, wherein the program instructions, upon execution, further cause the computer system to share at least a portion of the video visitation session between the resident and the non-resident with a 9-1-1 responder.

17. A hardware memory device having program instructions stored thereon that, upon execution by a computer system, cause the computer system to:
    receive an emergency services text message via a Rich Communication Services (RCS) server of a telecommunications carrier supporting a mobile device;
    send an emergency services video communication request to the mobile device; and
    initiate, in response to receiving an acceptance of the request from the mobile device, an emergency services video communication in response to receiving an acceptance of the request from the mobile device and allowing the emergency services video communication with a native application of the mobile device using privacy settings of the native application, exclusive of any third-party application.

18. The hardware memory device of claim 17, wherein the mobile device is operated during an ongoing video visitation session between an inmate and a non-resident of a correctional facility and, wherein the program instructions, upon execution, further cause the computer system to receive at least a portion of the ongoing video visitation session.

19. The hardware memory device of claim 18, wherein the program instructions, upon execution, further cause the computer system to share at least a portion of the video communication with an emergency responder.

20. The hardware memory device of claim 18, wherein the emergency services video communication is allowed, at least in part, upon a geo-location of the mobile device.

* * * * *